United States Patent
Dale et al.

(10) Patent No.: US 7,197,276 B2
(45) Date of Patent: Mar. 27, 2007

(54) DOWNSTREAM ADAPTIVE MODULATION IN BROADBAND COMMUNICATIONS SYSTEMS

(75) Inventors: Mark Dale, Laguna Hills, CA (US); David Hartman, Laguna Hills, CA (US); Anders Hebsgaard, Duluth, GA (US)

(73) Assignee: Broadcom Corporation, Irvine, CA (US)

( * ) Notice: Subject to any disclaimer, the term of this patent is extended or adjusted under 35 U.S.C. 154(b) by 509 days.

(21) Appl. No.: 10/097,942

(22) Filed: Mar. 15, 2002

(65) Prior Publication Data
US 2003/0176161 A1 Sep. 18, 2003

(51) Int. Cl.
*H04H 1/00* (2006.01)
(52) U.S. Cl. .................. 455/3.01; 455/428; 455/452.2; 370/317; 370/318
(58) Field of Classification Search ............... 455/3.01, 455/3.02, 428, 452.2, 69; 370/317, 318
See application file for complete search history.

(56) References Cited

U.S. PATENT DOCUMENTS 6,504,845 B1 * 1/2003 Petersen et al. ............ 370/412
6,512,749 B1 * 1/2003 Wright et al. ............... 370/316
6,597,669 B1 * 7/2003 Takahashi et al. .......... 370/325

* cited by examiner

*Primary Examiner*—Edan Orgad
(74) *Attorney, Agent, or Firm*—Sterne, Kessler, Goldstein & Fox PLLC

(57) ABSTRACT

A downstream adaptive modulation system and method. The downstream adaptive modulation system comprises a wireless access termination system and one or more wireless modems. The wireless access termination system includes a plurality of queues and a parser. The parser parses data traffic onto the plurality of queues. Each queue is associated with a different coding and modulation scheme. Each of the one or more wireless modems receives data traffic from the plurality of queues based on the wireless modem's ability to demodulate and decode the signal from each of the plurality of queues. When a wireless modem experiences a change in signal strength, the present invention enables the wireless modem to adapt to data from other queues to compensate for the change in signal strength. Thus, if the signal strength improves over a period of time, the wireless modem may receive data at a higher order modulation and FEC code rate. If the signal strength weakens over a period of time, the wireless modem may receive data at a lower order modulation and FEC code rate.

24 Claims, 11 Drawing Sheets

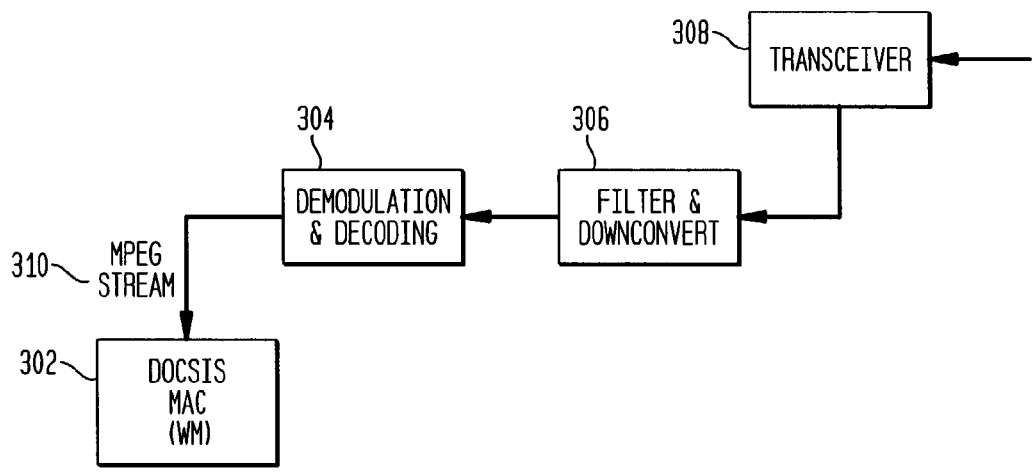
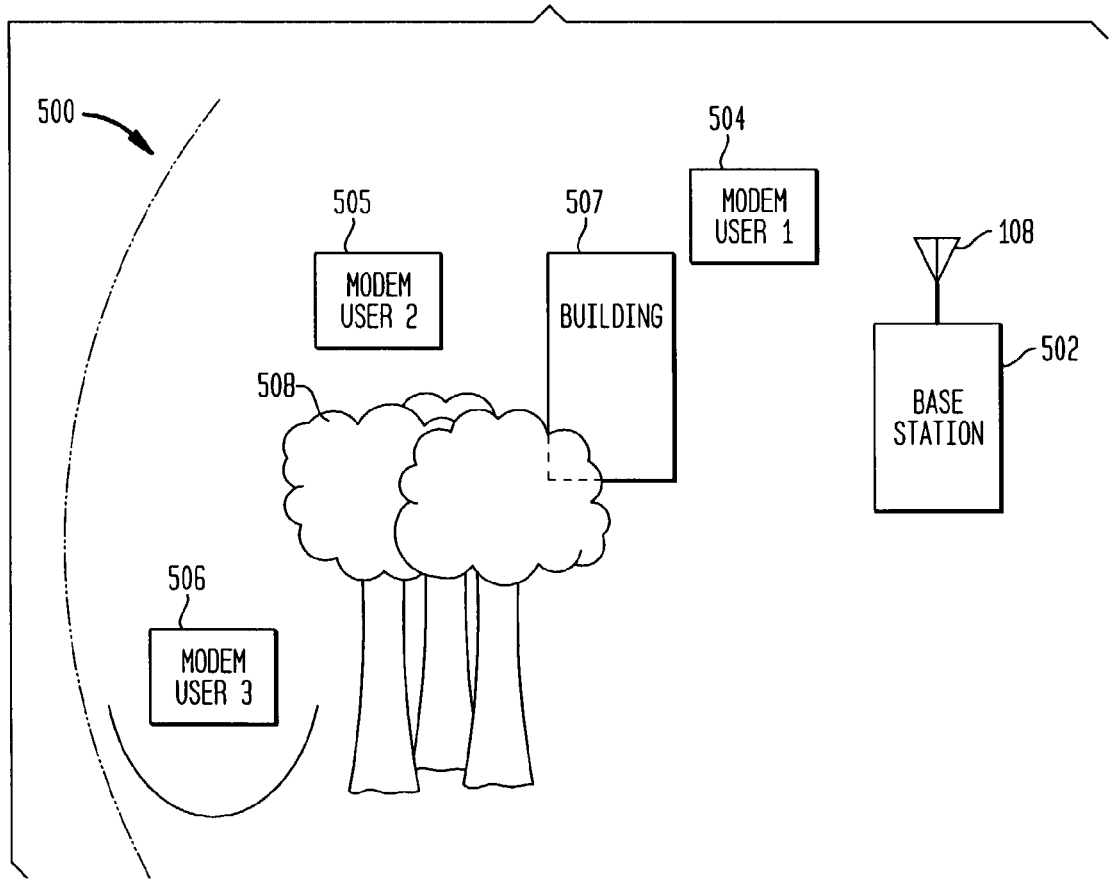

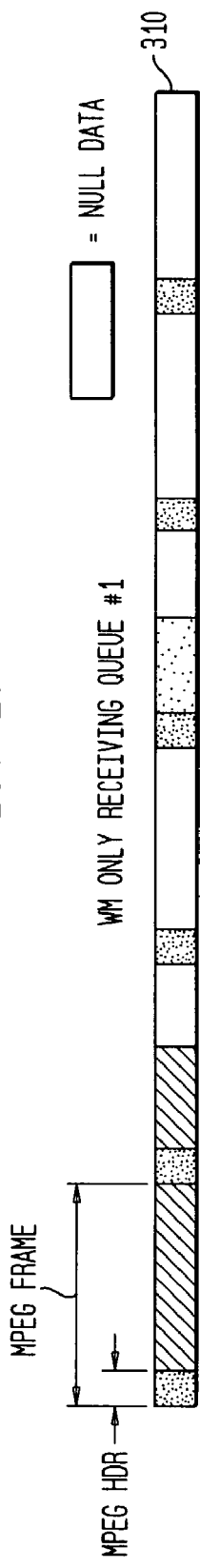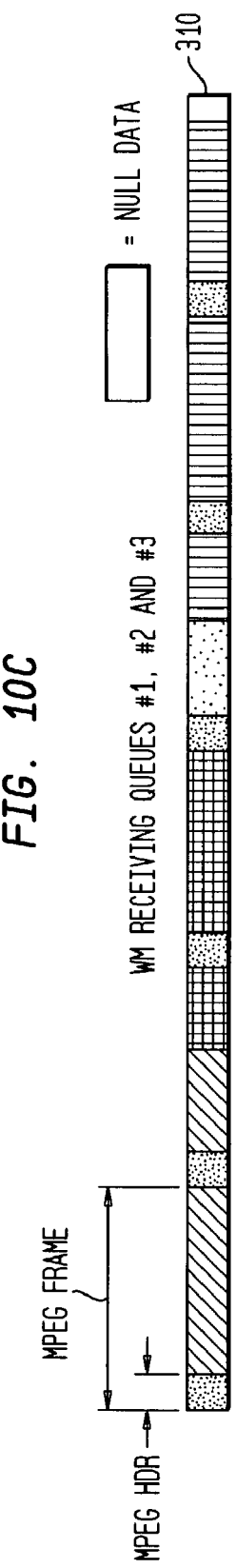

DOWNSTREAM ADAPTIVE MODULATION IN BROADBAND COMMUNICATIONS SYSTEMS

BACKGROUND OF THE INVENTION

1. Field of the Invention

The present invention is generally related to broadband communications systems. More particularly, the present invention is related to broadband fixed wireless systems that use Data Over Cable Service Interface Specification (DOCSIS) or any of its derivatives.

2. Background Art

In DOCSIS related broadband communications architectures, data is transferred between a central location and many remote subscribers. The central location may be referred to as a headend for cable systems, a wireless access termination system (WATS) for broadband terrestrial fixed wireless systems, or a satellite gateway for two-way satellite systems. Subscriber equipment may be referred to as a cable modem (CM) for cable systems, a wireless modem (WM) for broadband terrestrial fixed wireless systems, or a satellite modem (SM) for two-way satellite systems.

In a broadband terrestrial fixed wireless system, the communication path from the WATS to the WM is called the downstream and the communication path from the WM to the WATS is called the upstream. Downstream processing in current broadband terrestrial fixed wireless systems transmit data using time division multiplexed (TDM) signals over a single channel with a fixed modulation type and forward error correction (FEC) coding rate. Such signals have a fixed spectral efficiency in bits per second/Hertz (bps/hertz). The spectral efficiency that can be achieved depends on signal to noise ratio (SNR) and channel characteristics, such as distortion, fading, group delay variation, etc. Signal parameters such as modulation type, FEC coding type, and FEC coding rate determine the SNR required for the WM to have error-free or quasi error-free operation in a given channel. In a typical deployment, WMs experience a wide range of SNRs and channel conditions. This results in a large range of potential spectral efficiencies.

There is a trade-off between receiver parameters that allow for high throughput (high order modulation and high FEC code rates) and those that allow the signal to be reliably received at low SNRs, but with a lower throughput (low order modulations and robust low FEC code rates). Bandwidth efficiency can be controlled by the WATS through the selection of the modulation order, such as QPSK, 16 QAM, 64 QAM, etc., and the type and rate of the FEC used. The lower the bandwidth efficiency, the smaller the data throughput on a given downstream channel. Lower bandwidth efficiencies imply the ability to operate at reduced SNRs and/or in degraded channels.

In real world environments, subscribers experience a wide range of path losses and channel degradations. For example, in the case where a WATS is broadcasting to WMs that are located over a wide geographic area, various degradations, such as partial obstructions, antenna misalignments, etc., cause the signal power levels and SNRs received by individual subscribers to vary significantly. For current DOCSIS based systems, where modulation order and FEC parameters are fixed for a given channel, the modulation order and FEC parameters must be selected to allow the worst case WM to operate reliably. In other words, the system must operate with parameters that allow the worst case subscriber to obtain service with a given probability of success. Thus, subscribers that could otherwise receive data at a higher rate are penalized by the presence of disadvantaged subscribers.

Thus, what is needed is a system and method of dynamically assigning data traffic with different modulation orders and FEC parameters to different WMs within the same downstream channel, referred to hereinafter as "downstream adaptive modulation (DS-AM)." What is also needed is a system and method that implements DS-AM in a manner that enables non DS-AM enabled WMs to efficiently continue operation.

BRIEF SUMMARY OF THE INVENTION

The present invention solves the above mentioned needs by providing a system and method for frequency domain downstream adaptive modulation that enables wireless modems (WMs) receiving higher SNRs and/or operating in less degradated channels to achieve higher bandwidth efficiency. The invention provides improved channel capacity, increased range, and improved coverage. The invention maintains backward compatibility. That is, the invention allows previously installed systems that do not have adaptive modulation capabilities the ability to interoperate with adaptive modulation enabled systems.

Briefly stated, the downstream adaptive modulation system of the present invention comprises a wireless access termination system and one or more wireless modems. The wireless access termination system includes a plurality of queues and a parser. The parser parses data traffic onto the plurality of queues. Each queue has a different coding and modulation scheme. Each of the one or more wireless modems receives data traffic from the plurality of queues based on the wireless modem's ability to demodulate and decode the signal from each of the plurality of queues. When a wireless modem experiences a change in signal strength, the present invention enables the wireless modem to adapt to other queues or subchannels to compensate for the change in signal strength. Thus, if the signal strength improves over a period of time, the wireless modem may receive data at a higher order modulation and FEC code rate. If the signal strength weakens over a period of time, the wireless modem may receive data at a lower order modulation and FEC code rate.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

FIG. 3 is a block diagram illustrating downstream processing blocks for wireless modems (WM) using a conventional non-adaptive modulation technique.

FIG. 5A is a diagram illustrating advantaged and disadvantaged users of a broadband wireless communications system.

FIGS. 10A, 10B, and 10C show exemplary reconstructed MPEG data streams for advantaged and disadvantaged users according to an embodiment of the present invention.

Figure 11A:
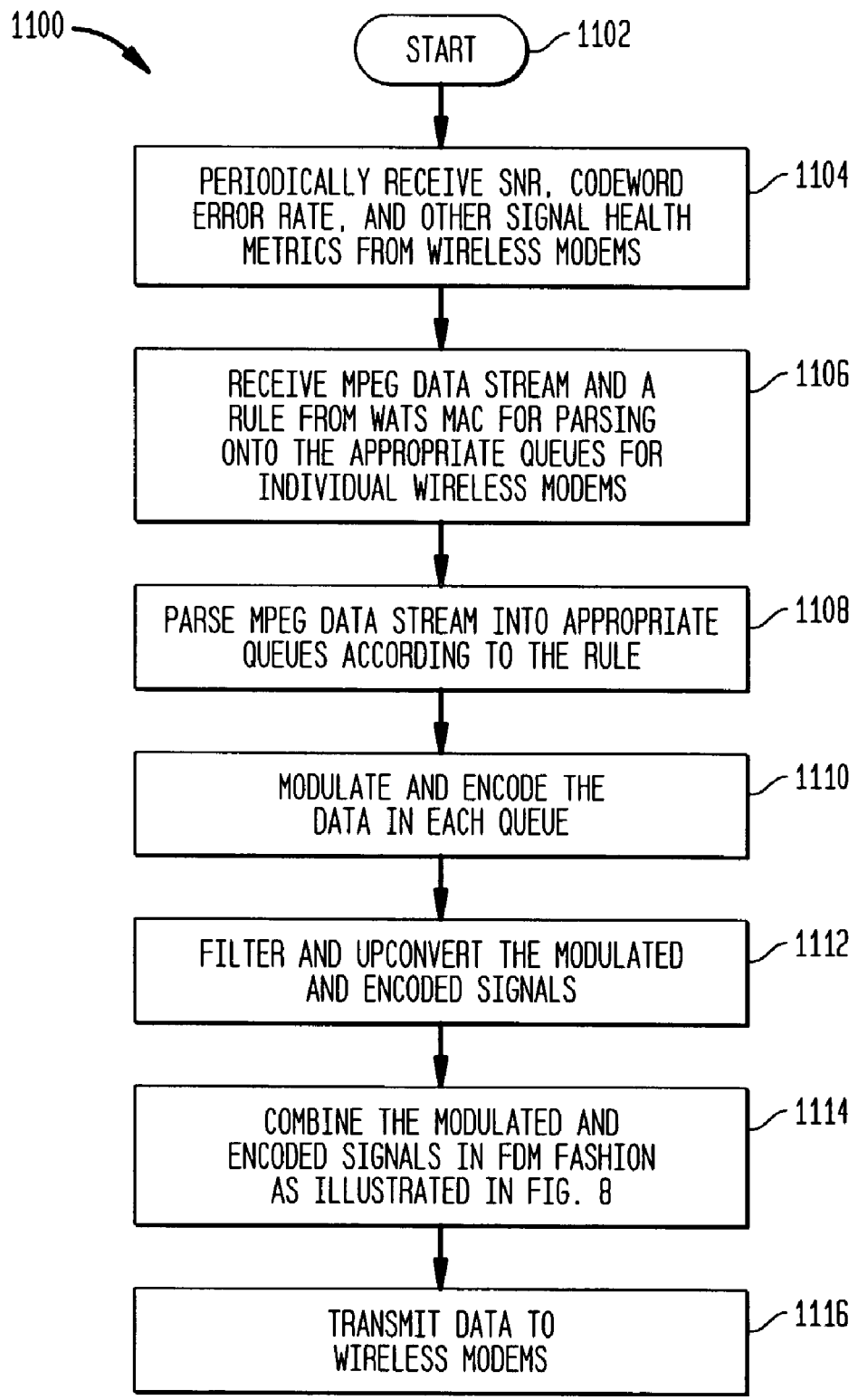

FIG. 11A is a flow diagram illustrating a method of frequency domain adaptive modulation for wireless access termination system according to an embodiment of the present invention.

Figure 11B:
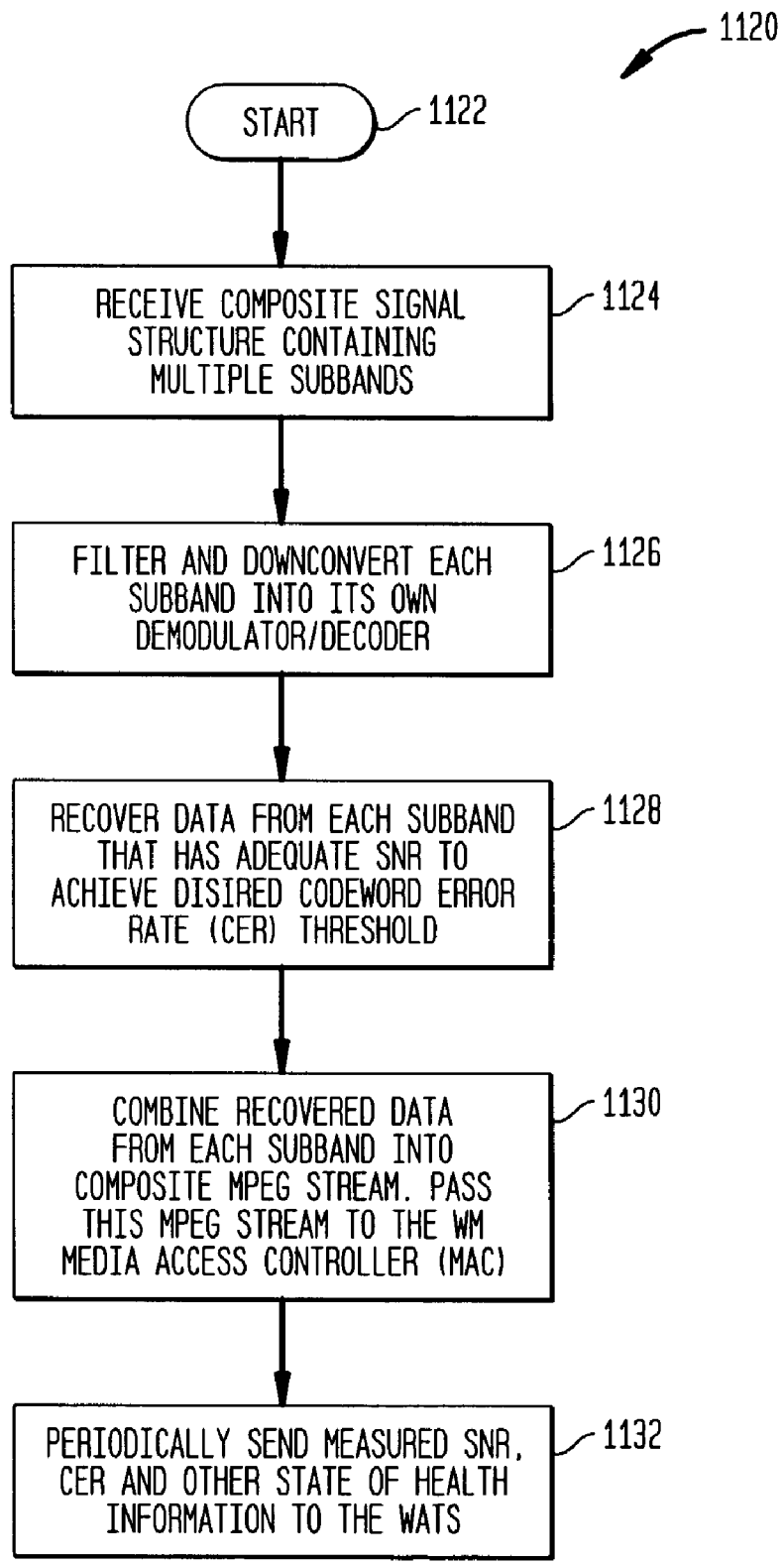

FIG. 11B is a flow diagram illustrating a method of frequency domain adaptive modulation for wireless modems according to an embodiment of the present invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawings in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
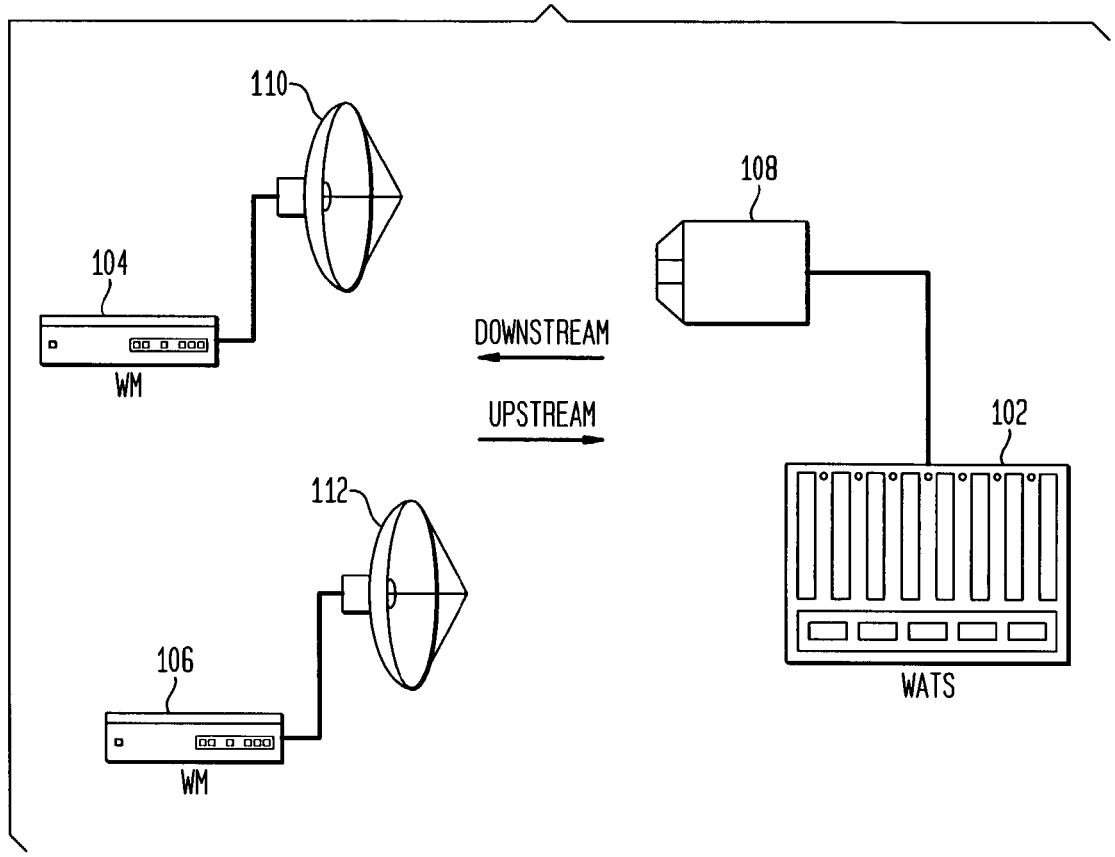
FIG. 1 is a high level block diagram of an exemplary broadband wireless communications system in accordance with embodiments of the present invention.

FIG. 1 is a high level block diagram of an exemplary broadband wireless communications system 100 in accordance with embodiments of the present invention. Broadband wireless communications system 100 enables voice communications, video and data services based on a bi-directional transfer of packet-based traffic between a wireless access termination system (WATS) 102 and one or more wireless modems (WM), such as wireless modems 104 and 106. Although broadband wireless communications system 100 is shown with only two wireless modems, any number of wireless modems may be included in the broadband wireless communications system of the present invention. Bi-directional transfer of packet-based traffic is achieved using antennas, such as antennas 108, 110, and 112. Antenna 108 is coupled to WATS 102 for transmitting/receiving packet-based traffic to/from WMs 104 and 106, respectively. Antennas 110 and 112 are coupled to WMs 104 and 106, respectively, for transmitting/receiving packet-based traffic to/from WATS 102. The communication path from WATS 102 to wireless modems 104 and 106 is called the downstream. The communication path from wireless modems 104 and 106 to WATS 102 is called the upstream.

WATS 102 is a central distribution point for broadband wireless communications system 100. WATS 102 manages the upstream and downstream transfer of data between WATS 102 and wireless modems, such as wireless modems 104 and 106. WATS 102 broadcasts information downstream to wireless modems 104 and 106 as a continuous transmitted signal in accordance with a time division multiplexing (TDM) technique. WATS 102 also controls the upstream transmission of data from wireless modems 104 and 106 to WATS 102 by assigning to each wireless modem (104 and 106) slots within which to transfer data in accordance with a time domain multiple access (TDMA) technique. Thus, each wireless modem (104 and 106) sends information upstream as short burst signals during a transmission opportunity allocated by WATS 102.

Each of wireless modems 104 and 106 operates as an interface to a user device (not shown). User devices may include, but are not limited to, personal computers, data terminal equipment, telephony devices, broadband media players, personal digital assistants, network-controlled appliances, or any other device capable of transmitting or receiving data. Wireless modems 104 and 106 perform the functions necessary to convert downstream signals received over broadband wireless communications system 100 into data packets for receipt by an attached user device. Wireless modems 104 and 106 perform the functions necessary to convert data signals received from the user devices into upstream burst signals suitable for transfer over broadband wireless communications system 100.

In exemplary broadband wireless communications system 100, wireless modems 104 and 106 operate in formats that adhere to the protocols set forth in the DOCSIS specification as well as proprietary protocols that extend beyond the DOCSIS specification. Additionally, WATS 102 operates to transmit, receive and process data transmitted to it in accordance with the protocols set forth in the DOCSIS specification and can also operate to transmit, receive and process data packets that are formatted using proprietary protocols that extend beyond those provided by the DOCSIS specification. The manner in which wireless modems 104 and 106 operate to receive data will be described in further detail herein. The manner in which WATS 102 operates to transmit and process data will also be described in further detail herein. The following description will now concentrate on the downstream transfer of data from WATS 102 to wireless modems 104 and 106.

Figure 2:
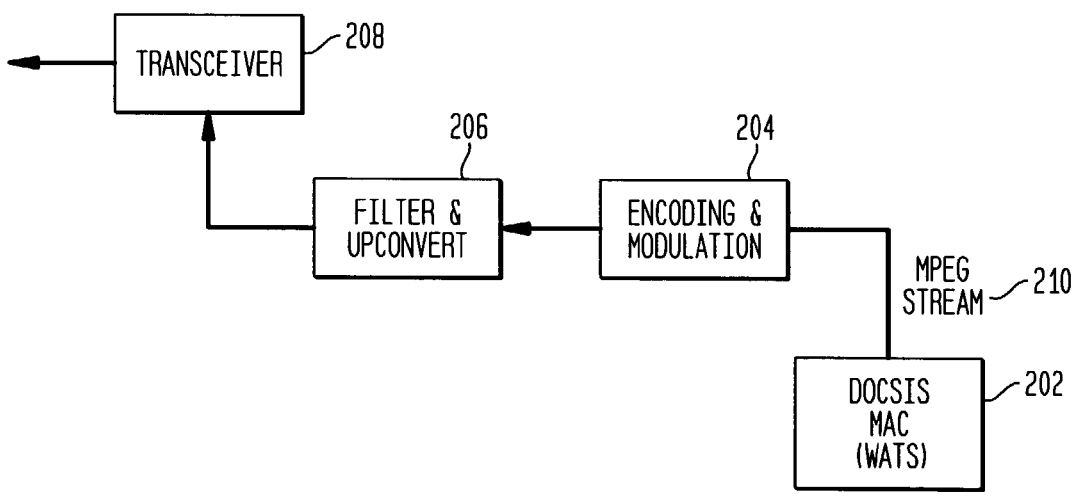
FIG. 2 is a block diagram illustrating downstream processing blocks for a wireless access termination system (WATS) using a conventional non-adaptive modulation technique.

FIG. 2 is a block diagram illustrating downstream processing blocks for wireless access termination system (WATS) 102 using a conventional non-adaptive modulation technique. The downstream process is described using an MPEG data stream for exemplary purposes. Other types of data streams may also be used. The WATS downstream process includes a WATS DOCSIS MAC (media access control) 202, an encoding and modulation processing block 204, a filter and upconverter processing block 206, and a transceiver 208.

During downstream processing WATS DOCSIS MAC 202 outputs an NPEG data stream 210. Encoding and modulation processing block 204 encodes and modulates MPEG data stream 210 with a single type of modulation and a single set of forward error correction (FEC) parameters. For example, modulation for downstream transmissions in a DOCSIS based communications system is typically 64-QAM with 6 bits per symbol or 256-QAM with 8 bits per symbol. An exemplary forward error correction technique may include the Reed-Solomon error correction. Encoding and modulation are well known processes to those skilled in the relevant art(s). Filter and upconverter processing block 204 converts the encoded modulated signal to a higher frequency and filters the converted signal. Filtering and upconverting are well known processes to those skilled in the relevant art(s). Transceiver 208 transmits the filtered signal over the air waves to wireless modems, such as wireless modems 104 and 106.

FIG. 3 is a block diagram illustrating downstream processing blocks for wireless modems (WMs) using a conventional non-adaptive modulation technique. The downstream process for wireless modems is the reverse process of that shown in FIG. 2 for WATS 102. The downstream processing blocks for wireless modems, such as wireless modems 104 and 106, result in a reconstruction of the original MPEG data stream transmitted by WATS DOCSIS MAC 202. The downstream processing blocks include a transceiver 308, a filter and downconverter block 306, a demodulation and decoding block 304, and a WM DOCSIS MAC 302.

Transceiver 308 receives the filtered signal transmitted over the air waves via transceiver 208. Filter and downconverter block 306 converts the received signal to a lower frequency and filters the lowered frequency signal. The processes of downconverting and filtering are well known to those skilled in the relevant art(s). The downconverted filtered signal is then demodulated and decoded by demodulation and decoding block 304. For example, demodulation may include a QAM-64/256 demodulator with Reed Solomon error correction. Demodulation and decoding are processes that are well known to those skilled in the relevant art(s). Demodulation and decoding block 304 outputs an NPEG datastream 310 similar to MPEG datastream 210 output from WATS DOCSIS MAC 202. MPEG datastream 310 is sent to WM DOCSIS MAC 302 to be processed and routed to a user device (not shown).

Figure 4:
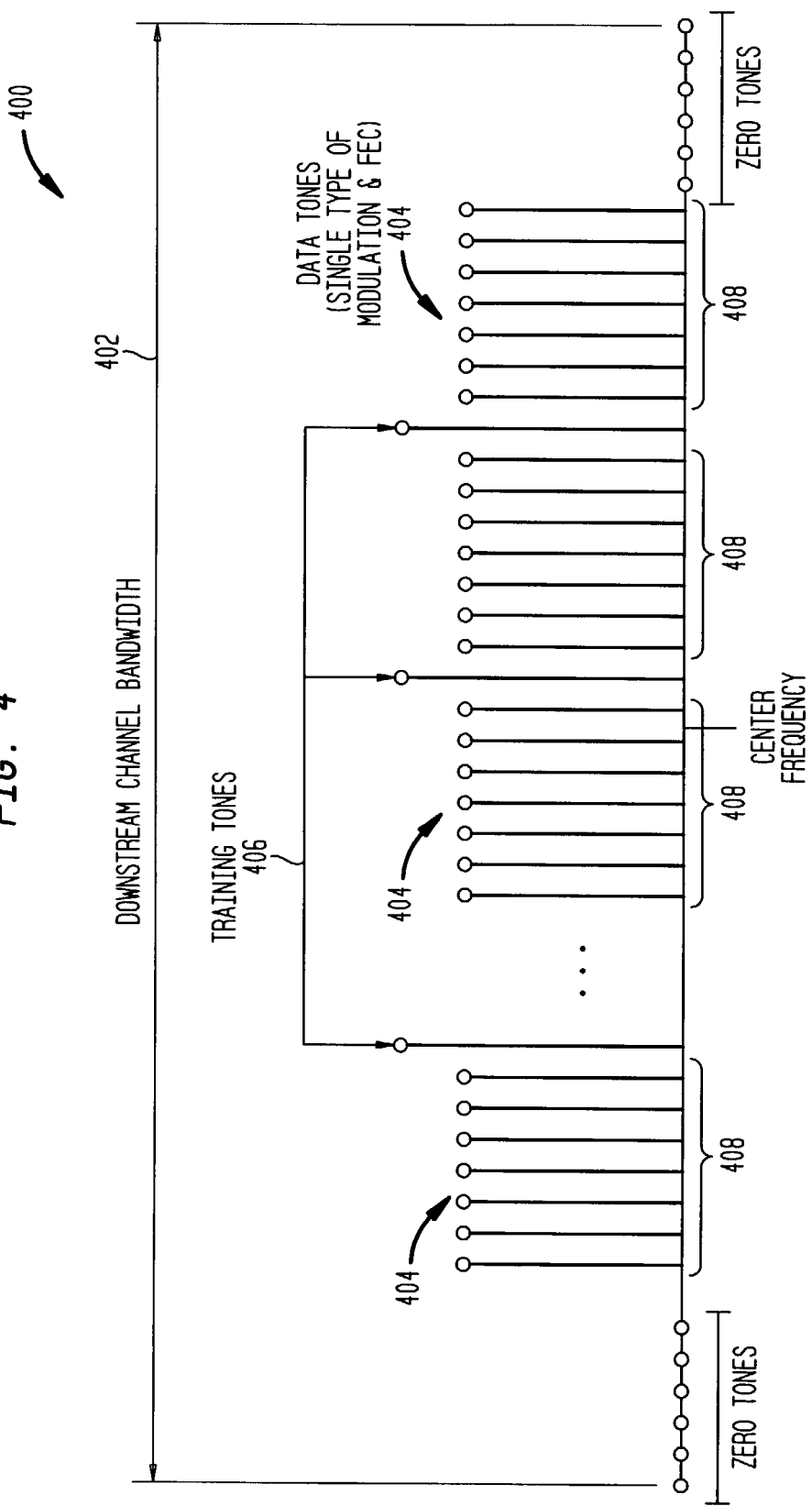
FIG. 4 is a graphical representation of downstream channel bandwidth for an exemplary non-adaptive modulation signal structure using orthogonal frequency division multiplexing.

FIG. 4 is a graphical representation of downstream channel bandwidth for an exemplary non-adaptive modulation downstream signal structure using orthogonal frequency division multiplexing. Graph 400 illustrates a downstream channel bandwidth 402 comprised of data tones 404. Data tones 404 consist of a single type of modulation, such as, for example, 64-QAM or 256-QAM, and a single type of FEC, such as, for example, Reed Solomon error correction. Note that graph 400 also contains training tones 406 interspersed between each set of data tones 408. Training tones 406 are of known amplitude and phase, and are used to extract information about the channel. Training tones may also contain coded parameter signals that provide information regarding the type of modulation and coding rates, and other information. Graph 400 also contains zero tones 410. Zero tones 410 are provided at the band edges to relax filtering requirements.

FIG. 5A is a diagram 500 illustrating advantaged and disadvantaged users of broadband wireless communications system 100. Diagram 500 comprises a base station 502 and a plurality of wireless modem users 504–506 that transmit to, and receive signals from, base station 502. Base station 502 houses WATS 102 and WATS antenna 108. Although only three modem users 504–506 are shown in diagram 500, in reality, approximately 1–2000 modem users may transmit to, and receive signals from, WATS 102 via base station 502.

Diagram 500 shows a wide range of different path losses to different modem users. For example, modem user 504 is located right next to base station 502, and has a clear line of sight to base station 502. Thus, the path loss from modem user 504 to base station 502 is minimal. The channel characteristics should also be good for modem user 504. That is, little or no distortion, fading, group delay variation, etc. should exist on the channel which modem user 504 receives its data. Thus, modem user 504 is considered to be an advantaged user.

Modem user 505 is located to the left of modem user 504. The path loss from modem user 505 to base station 502 is greater than that for modem user 504 due to modem user 505 being at a greater distance away from base station 502. Also, a building 507 in the pathway between base station 502 and modem user 505 also may cause additional losses and/or channel distortion, fading, group delay variation, etc. Thus, modem user 505 is at a slight disadvantage when compared to modem user 504.

Modem user 506 will experience the greatest path loss since it is located in a valley to the left of modem user 505, and has building 507 and a bunch of trees 508 in the pathway between base station 502 and modem user 506. Thus, modem user 506 is considered to be the most disadvantaged user of modem users 504 and 506.

As previously stated, conventional systems are set up to enable the most disadvantaged modem user, such as modem user 506, to operate reliably, while possibly penalizing more advantaged modem users, such as modem users 504 and 505, by not enabling them to receive data at a higher rate since they can operate at higher SNRs and/or in less degraded channels.

Figure 5B:
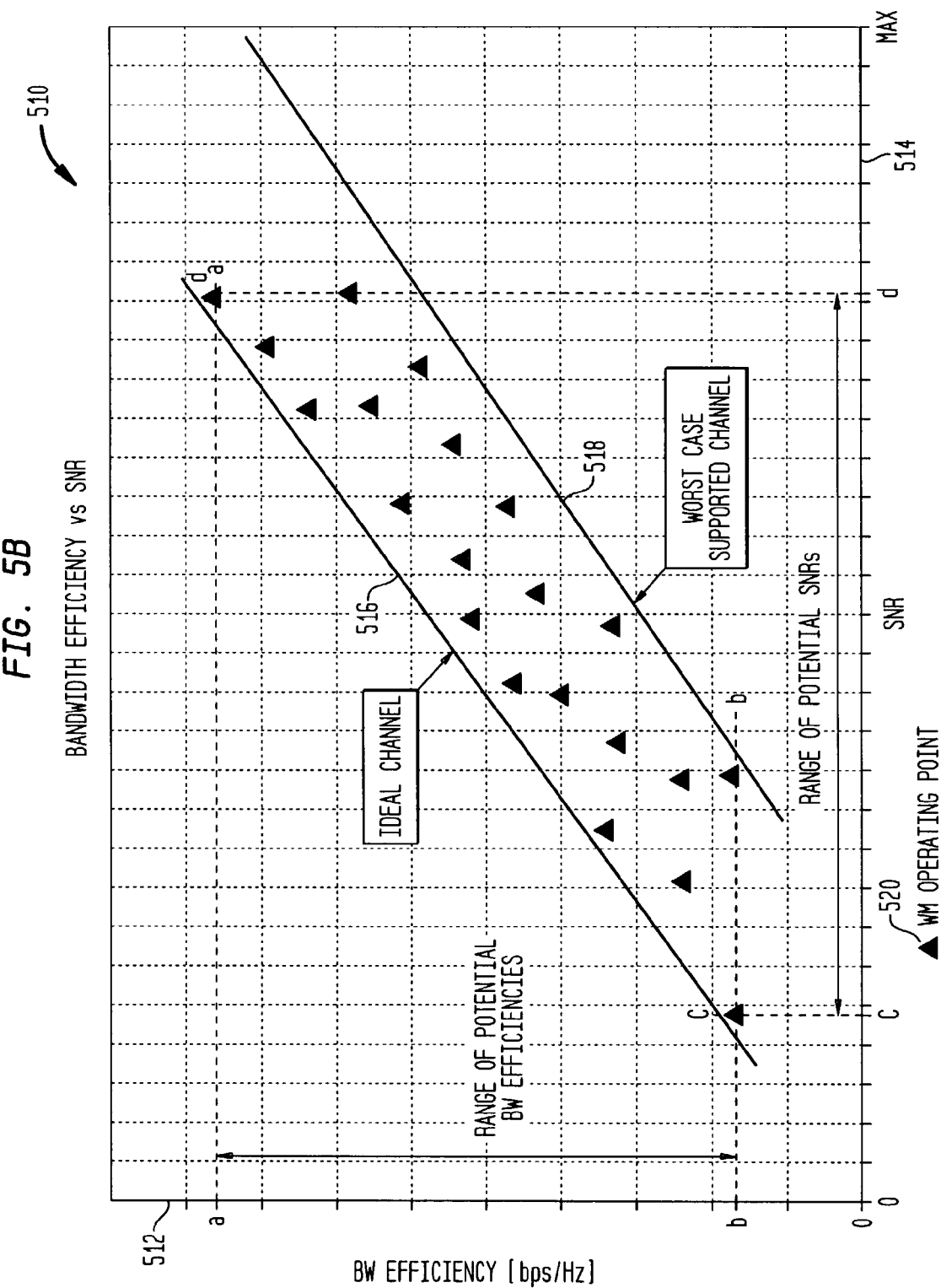
FIG. 5B is a graphical illustration of spectral bandwidth efficiencies as a function of signal-to-noise (SNR) in different channels.

Higher SNRs enable wireless modems to achieve higher bandwidth efficiencies, which results in higher data throughput. FIG. 5B is a graph 510 illustrating spectral bandwidth (BW) efficiencies (bps/Hz) 512 as a function of signal-to-noise ratio (SNR) 514 in different channels. Graph 510 shows a range of potential BW efficiencies lying between dotted lines a—a and b—b and a range of potential SNRs lying between dotted lines c—c and d—d. A solid line 516 represents an ideal or best case supported channel and a solid line 518 represents a worst case supported channel. Example wireless modem operating points 520 are shown triangular-shaped. All wireless modem operating points 520 fall within the ideal and worst case supported channels (that is, within solid lines 516 and 518).

As illustrated in graph 510, wireless modems need a certain signal-to-noise ratio to operate at a certain bandwidth efficiency. The more bandwidth efficient the wireless modem, the higher the SNR required for the wireless modem to operate. Also, the SNR that is required also depends on the kind of channel through which the signal is received. For example, if the signal comes through an ideal channel, that is, a channel with little or no distortion, fading, group delay variation, etc., then the wireless modem can actually operate at a lower SNR. In the alternative, if the signal comes through a worst case supported channel, that is, a channel with lots of distortion, fading, group delay variation, etc., then the wireless modem will need to operate at a higher SNR.

Bandwidth efficiency can be controlled by WATS 102 by selection of the modulation order, such as QPSK, 16 QAM, 64 QAM, etc., and the type and rate of the forward error correction (FEC) used. The lower the bandwidth efficiency, the smaller the data throughput on a given downstream channel. However, as shown in FIG. 5B, lower bandwidth efficiencies imply the ability to operate at reduced SNR and/or in degraded channels.

Wireless modems experience a wide range of potential bandwidth efficiencies. With conventional systems, modulation order and FEC parameters are fixed for a given channel and are selected to allow the worst case wireless modem or most disadvantaged wireless modem user to operate reliably.

The present invention dynamically assigns data traffic with different modulation orders and FEC parameters to different wireless modems within the same channel. This allows wireless modems receiving higher SNRs and/or operating in less degraded channels to achieve higher bandwidth efficiency. This capability is known as adaptive modulation.

Downstream Adaptive Modulation

The present invention implements downstream adaptive modulation by parsing an MPEG data stream from WATS DOCSIS MAC 202 into multiple separate queues. Each queue has an associated modulation order and set of FEC parameters. Each queue is separately encoded and transmitted on an individual subchannel. Thus, the present invention allows a single channel to provide a plurality of different modulation orders and sets of FEC parameters to enable wireless modems receiving higher SNR and/or operating in less degraded channels to utilize subchannels that have higher bandwidth efficiencies. Higher bandwidth efficiency results in higher data throughput.

Figure 6:
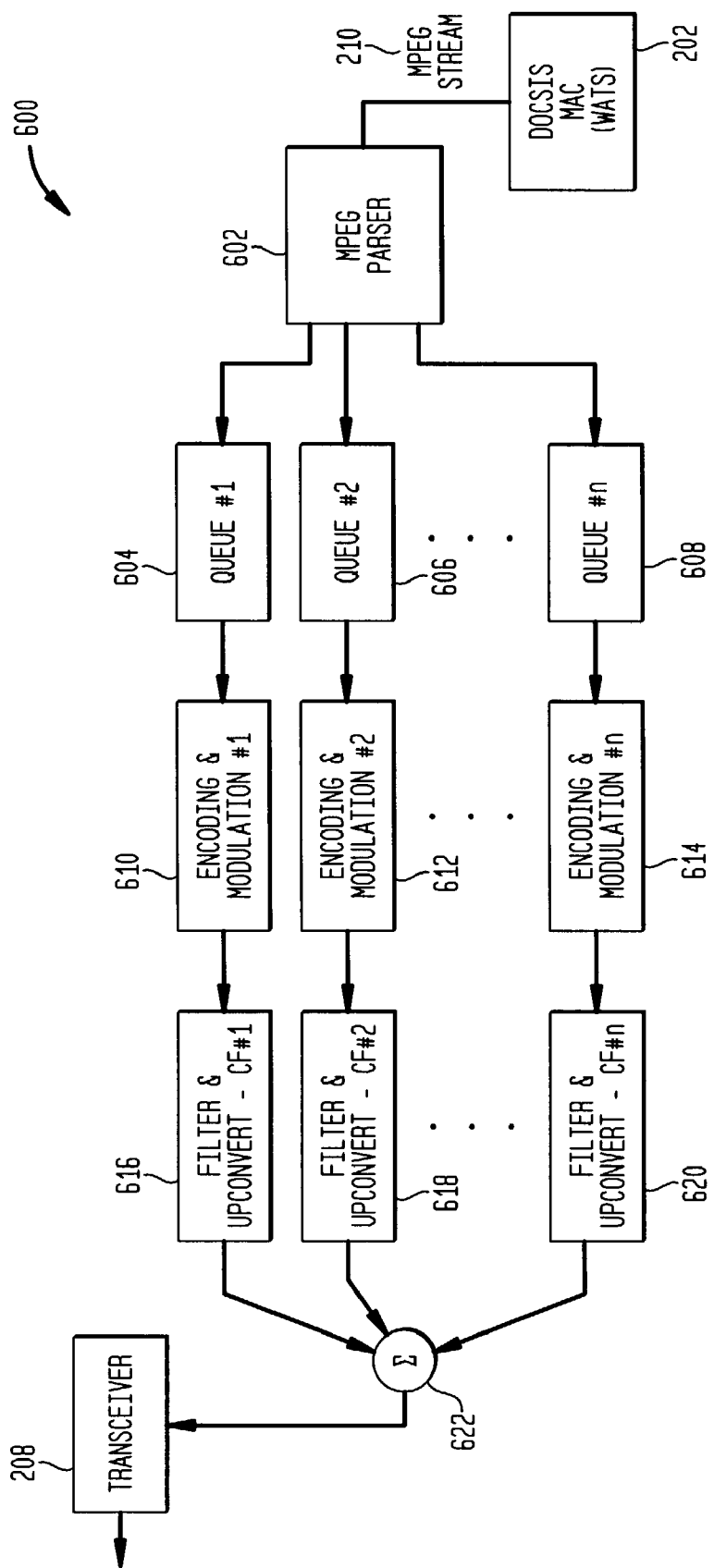
FIG. 6 is a block diagram illustrating frequency domain downstream adaptive modulation for a wireless access termination system (WATS).

FIG. 6 is a block diagram 600 illustrating frequency domain downstream adaptive modulation for a wireless access termination system (WATS). Block diagram 600 comprises WATS DOCSIS MAC 202, an MPEG parser 602, a plurality of queues 604, 606, and 608, a plurality of encoding and modulation blocks 610, 612, and 614, a plurality of filter and upconverter blocks 616, 618, and 620, a summer 622, and transceiver 208.

WATS DOCSIS MAC 202 outputs MPEG data stream 210 to MPEG parser 602. MPEG parser 602 parses MPEG data stream 210 into a plurality of queues, such as queues 604, 606, and 608, based on the type of modulation and FEC parameters and the wireless modem identified to receive the data.

Figure 7:
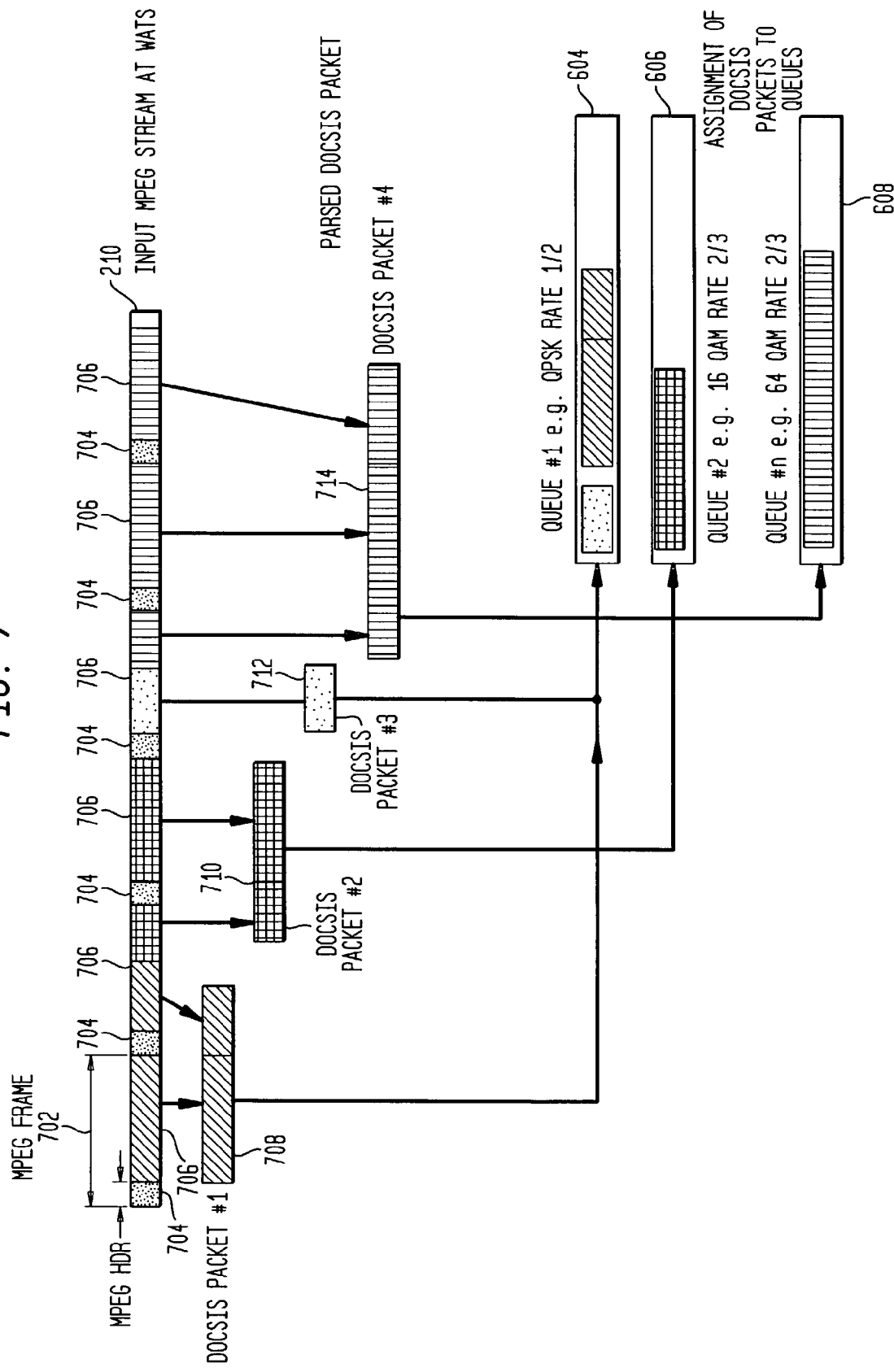
FIG. 7 is a diagram illustrating an exemplary parsing operation of an MPEG data stream onto a plurality of queues.

FIG. 7 is a diagram illustrating an exemplary parsing operation of an MPEG data stream onto a plurality of queues. FIG. 7 shows an MPEG stream 210 from WATS 102 having a plurality of MPEG frames 702. MPEG frame 702 is comprised of an MPEG header 704 and data 706. A rule, determined by WATS 102, is used to parse the data onto each queue. Essentially, the MPEG framing is stripped from the data and IP packets of variable lengths are formed.

In the example shown in FIG. 7, a first DOCSIS data packet 708 is formed using data from the first two MPEG frames in MPEG stream 210. DOCSIS data packet 708 is to be modulated using QPSK (Quadrature Phase Shift Keying). A second DOCSIS data packet 710 is formed using data from the second and third MPEG frames in MPEG stream 210. DOCSIS data packet 710 is to be modulated using 16 QAM (Quadrature Amplitude Modulation). A third DOCSIS data packet 712 is formed using data from the fourth MPEG frame in MPEG stream 210. DOCSIS data packet 712 is to be modulated using QPSK. A fourth DOCSIS data packet 714 is formed using data from the fourth, fifth, and sixth MPEG frames in MPEG stream 210. DOCSIS data packet 714 is to be modulated using 64 QAM.

According to the rule, all data to be modulated using QPSK is placed into Queue #1 (604), all data to be modulated using 16 QAM is placed into Queue #2 (606), and all data to be modulated using 64 QAM is placed into Queue #n (608). Thus, Queue #1 (604) receives data from the first, second, and fourth NPEG frames 702. Queue #2 (606) receives data from the second and third MPEG frames 702. Queue #n (608) receives data from the fourth, fifth, and sixth MPEG frames 702.

In this example, Queue #1 is the most robust queue. That is, all users, including the most disadvantaged user, will be able to receive data from Queue #1. Also note that Queue #1 has the lowest order modulation and the strongest coding.

The DOCSIS protocol includes some messages that are broadcast to all WMs. Examples include: (a) time stamp messages (sometimes called SYNC messages) that communicate timing information required for proper time synchronization of upstream bursts, (b) Upstream Channel Descriptor (UCD) messages communicating the parameters of various upstream channels, and (c) MAP messages containing bandwidth allocation messages for the various WMs. These messages (and other kinds of broadcast messages) must be reliably received by all WMs at all times. Hence these messages should always be placed in the most robust queue (Queue #1 in the preceding example).

Figure 8:
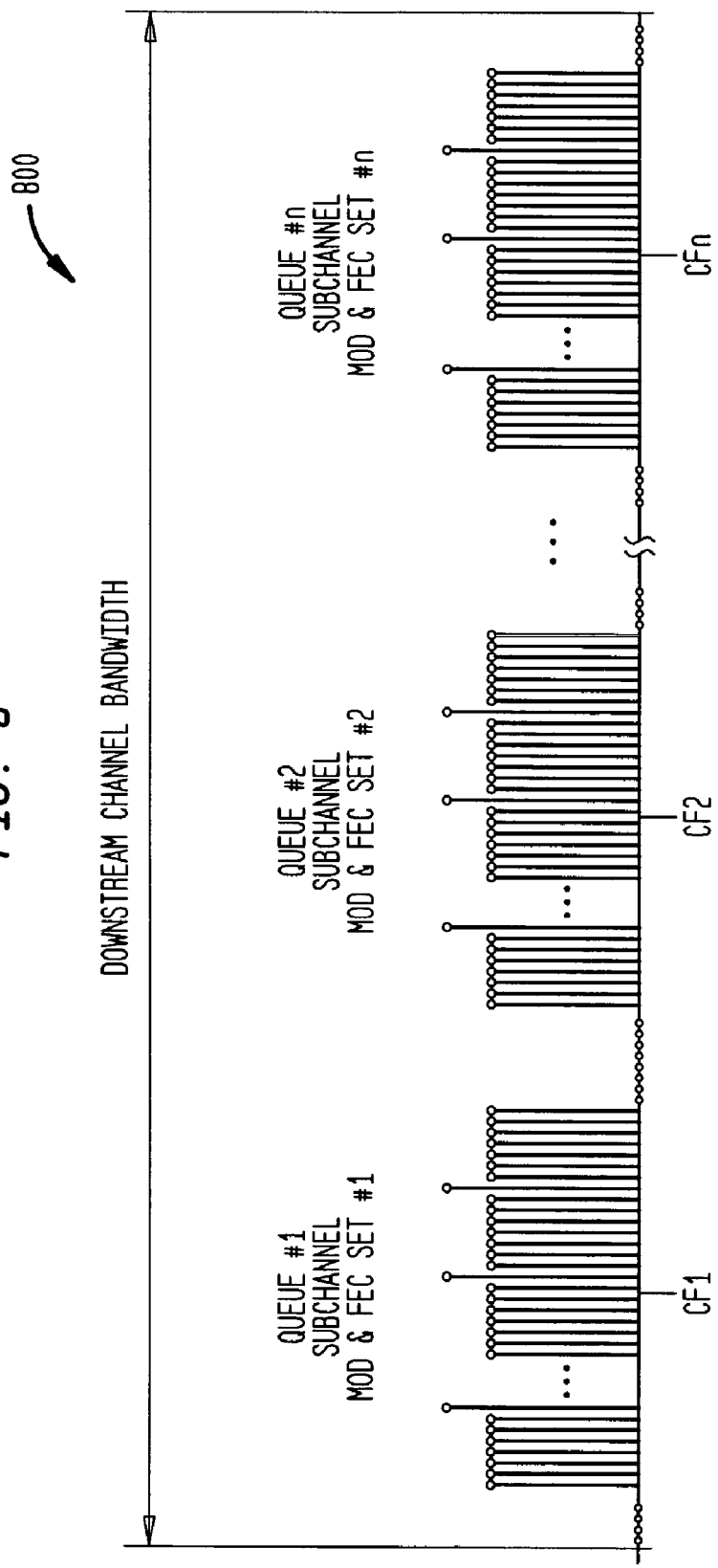
FIG. 8 is a graphical representation of a downstream channel bandwidth for an exemplary adaptive modulation signal structure using orthogonal frequency division multiplexing.

FIG. 8 is an exemplary diagram 800 illustrating wireless modem access to queues 1–n according to an embodiment of the present invention. With the present invention, some modem users may be able to receive data from all of the queues in the system while other modem users may only be able to use data from a subset of all the queues in the system. In diagram 800, a frequency domain representation of each queue (queue #1, queue #2, . . . , queue #n) is shown. Using the same scenario as depicted in FIG. 7, data in queue #1 is modulated using QPSK modulation, data in queue #2 is modulated using 16-QAM modulation, and data in queue #n is modulated using 64-QAM modulation. Thus, the most robust subchannel is queue #1 and the least robust subchannel is queue #n.

Based on each modem's SNR and bit errorrate, modem user 506 may only retrieve data from queue #1, modem user 505 may retrieve data from both queue #1 and queue #2, but not from any queue higher than queue #2, and modem user 504 may retrieve data from all queues up to and including queue #n. Thus, the more disadvantaged the user, the less likely that user will be able to retrieve data modulated at a higher modulation order. The more advantaged the user, the more likely the user will be able to retrieve data at a higher modulation order as well as from all of the other queues having a lower modulation order.

Returning to FIG. 6, data from queue #1 to queue #n (604–608) is sent to encoding and modulation blocks (610–612), respectively. Encoding and modulation blocks 610–612 encode and modulate the data from queues 604, 606, and 608 using a different modulation order (QPSK, 16 QAM, 64 QAM, etc.) and type and rate of forward error correction (FEC), respectively. Although the invention is described using QPSK, 16-QAM, and 64-QAM modulation techniques, the invention is not limited to these modulation techniques. One skilled in the art would know that other modulation techniques could be used as well. The encoded and modulated data from encoding and modulation blocks 610–612 are sent to filter and upconverter blocks 616–620. Filter and upconverter blocks 616–620 operate to filter and convert the encoded and modulated data to a higher frequency to provide subchannels. Filter and upconverter blocks 616–620 operate in a manner similar to filter and upconverter block 206. The subchannels from each queue (604–606) are combined into one channel using summer 622 and transmitted via transceiver 208 across the air waves to the various wireless modems, such as wireless modems 104 and 106.

Figure 9:
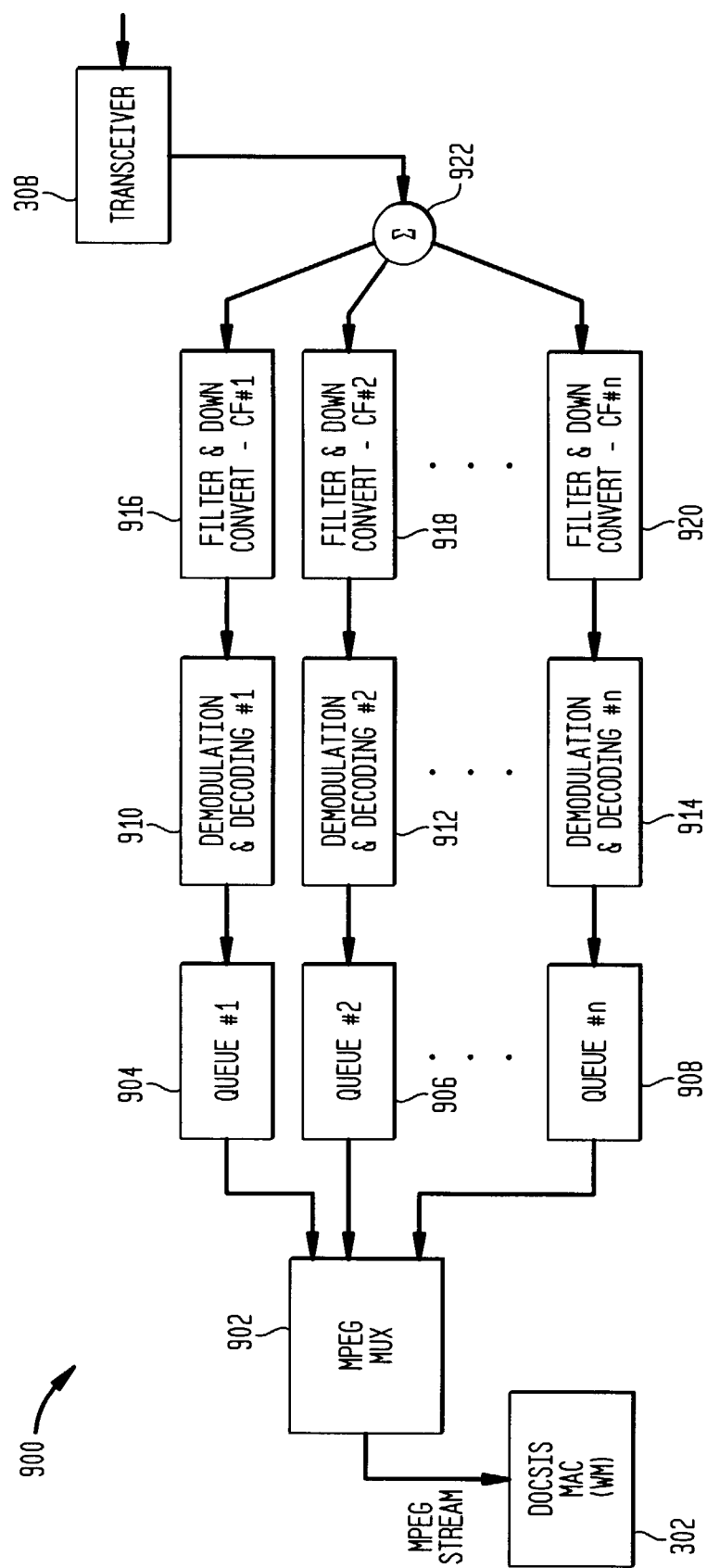
FIG. 9 is a block diagram illustrating frequency domain downstream adaptive modulation for a wireless modem.

FIG. 9 is a block diagram 900 illustrating frequency domain downstream adaptive modulation at the wireless modem side. The downstream adaptive modulation block diagram 900 for wireless modems basically illustrates an inverse process of the downstream adaptive modulation block diagram 600 for WATS 102. Block diagram 900 comprises WM DOCSIS MAC 302, an MPEG multiplexer 902, a plurality of queues 904, 906, and 908, a plurality of demodulation and decoding blocks 910, 912, and 914, a plurality of filter and downconverter blocks 916, 918, and 920, a summer/splitter 922, and transceiver 308.

Wireless modems, such as wireless modems 104 and 106, receive the channel bandwidth signal transmitted over the air waves by transceiver 208 via transceiver 308. The signal is then sent to summer/splitter 922, where the signal power is divided. Once summer/splitter 922 divides the signal power, the signal is sent to each of filter and downconverter blocks 916, 918, and 920. Filter and downconverter blocks 916, 918, and 920 filter the signal to capture the appropriate subchannel for the respective queue and convert the signal to a lower frequency.

The signals for each queue are then demodulated and decoded using demodulation and decoding blocks 910, 912, and 914, respectively. Thus, according to the example described in FIGS. 7 and 8, demodulator and decoding block 910 uses QPSK demodulation, demodulator and decoding block 912 uses 16-QAM demodulation, and demodulator and decoding block 914 uses 64-QAM demodulation. Each subchannel signal is demodulated and decoded accordingly, and the results are placed in their corresponding queues 904, 906, and 908.

MPEG multiplexer 902 combines the data from each queue and outputs an MPEG data stream 310 similar to MPEG data stream 210. When the wireless modem is unable to demodulate and decode a signal on a specific queue, null data is put into MPEG data stream 310 in place of the data for that queue.

Returning to the previous example, if the wireless modem is able to demodulate all of the modulation signals used in demodulation and decoding blocks 910, 912, and 914 (QPSK, 16-QAM, and 64-QAM, respectively), then MPEG data stream 310 will be essentially identical to MPEG data stream 210. If the wireless modem is only capable of performing QPSK and QAM-16 demodulation for demodulating and decoding blocks 910 and 912, then MPEG data stream 310 will be a subset of MPEG data stream 210 with the data from queue #n replaced with null data. And lastly, if the wireless modem is only capable of performing QPSK demodulation for demodulation and decoding block 910, then MPEG data stream will be a subset of MPEG data stream 210 with the data from queue #2 and queue #n replaced with null data.

FIGS. 10A, 10B, and 10C show exemplary reconstructed MPEG data streams 310 for advantaged and disadvantaged users according to an embodiment of the present invention.

FIG. 10A shows a reconstructed MPEG data stream 310 for disadvantaged modem user 506. In this instance, reconstructed MPEG data stream 310 contains all of the data from Queue #1 and null data representative of Queue #2 and Queue #n. FIG. 10B shows a reconstructed MPEG data stream 310 for slightly disadvantaged modem user 505. Reconstructed MPEG data stream 310 contains a subset of MPEG data stream 210. It contains all of the data from Queue #1 and Queue #2, and contains null data representative of queue #n. FIG. 10C shows a reconstructed MPEG data stream 310 for advantaged modem user 504. Reconstructed MPEG data stream 310 is identical to MPEG data stream 210 shown in FIG. 7.

Thus, the advantaged users (i.e., the users capable of demodulating the high order modulations) see all of the MPEG data stream while the less advantaged users (i.e., the users capable of demodulating the lower order modulations) see their data, the data from all of the users less advantaged than itself, and null data where the more advantaged users' data packets would be located on the MPEG data stream.

After the MPEG data stream 310 is configured, the MPEG data stream 310 is then sent to WM DOCSIS MAC 302 to be processed and routed to a user device (not shown). WM DOCSIS MAC 302 will extract all of the data from MPEG data stream 310 that has its destination address and decrypt the data.

As previously stated, the present invention is backward compatible. That is, the present invention allows previously installed systems that do not have adaptive modulation capabilities to interoperate with adaptive modulation enabled systems. With systems that do not have adaptive modulation capabilities, a wireless modem will scan the data from each queue in the adaptive modulation system until it finds data in the downstream that it can demodulate. When the wireless modem finds a valid channel from which it can demodulate the signal, and also obtain timestamps as well as other MAC management messages, the wireless modem will retrieve the downstream data from that queue as if it had adaptive modulation capabilities.

Method of Operation

FIG. 11A is a flow diagram 1100 illustrating a method of frequency domain adaptive modulation for a wireless access termination system according to an embodiment of the present invention. The invention is not limited to the description provided herein with respect to flow diagram 1100. Rather, it will be apparent to persons skilled in the relevant art(s) after reading the teachings provided herein that other functional flow diagrams are within the scope of the present invention. The process begins with step 1102, where the process immediately proceeds to step 1104.

In step 1104, WATS 102 periodically receives SNR, codeword error rate, and other signal health metrics from the wireless modems. WATS MAC 202 uses this information to generate a rule for parsing an MPEG stream onto a plurality of queues to provide different modulation and FEC parameters for wireless modems, such as wireless modems 104 and 106.

In step 1106, the rule and a MPEG data stream is received from WATS MAC 202 for parsing the MPEG data stream onto the plurality of queues for individual wireless modems. Parsing the MPEG data stream onto the plurality of queues was previously described in FIG. 7.

In step 1108, the MPEG data stream is parsed into the appropriate queues according to the rule generated by WATS MAC 202. The data from each queue is modulated and encoded in step 1110. Each queue provides a different modulation and FEC code rate as described above.

In step 1112, the modulated and encoded signals for each queue are upconverted and filtered to provide subchannels for transmission.

In step 1114, the filtered subchannel data from each queue is combined in FDM fashion as illustrated in FIG. 8, and transmitted to the wireless modems in step 1116. The process performs steps 1104–1116 continuously as data is input from the WATS MPEG data stream.

FIG. 11B is a flow diagram 1120 illustrating a method of frequency domain adaptive modulation for wireless modems according to an embodiment of the present invention. The invention is not limited to the description provided herein with respect to flow diagram 1120. Rather, it will be apparent to persons skilled in the relevant art(s) after reading the teachings provided herein that other functional flow diagrams are within the scope of the present invention. The process begins with step 1122, where the process immediately proceeds to step 1124.

In step 1124, a composite signal structure containing multiple subbands (i.e., subchannels), as shown in FIG. 8, is received.

In step 1126, the composite signal structure is then filtered to obtain each subband and downconverted for appropriate demodulation and decoding.

In step 1128, data from each subband that has adequate SNR to achieve a desired codeword error rate (CER) threshold is recovered.

In step 1130, the recovered data from each subband is combined into a composite MPEG stream, as described in FIG. 10, for transmission to the appropriate WM MAC 302 for processing and transmission to a corresponding user device. For subbands (or queues) in which a particular wireless modem is unable to decode and demodulate, null data is used as a replacement.

Each wireless modem periodically measures downstream SNR, codeword error rate, and other state of health information to determine which queues (or subbands) the wireless modems can decode and demodulate. In step 1132, each wireless modem periodically transmits measured SNR, codeword error rate, and other signal health metrics upstream to WATS MAC 202 during its assigned slot in accordance with a time domain multiple access (TDMA) technique. This information may be transmitted in the form of a MAC management message or by other means. For example, the information may also be embedded in an extended header.

If a wireless modem is detecting errors on the subband designated by WATS MAC 202 for receiving its traffic, the wireless modem will drop down to a lower subband to receive its data traffic and will communicate this to WATS MAC 202 when periodically transmitting SNR, codeword error rate, etc.

By continuously transmitting the signal health metrics to WATS 102, WATS 102 may not only decide to transmit data traffic at a lower channel to a wireless modem when SNR and codeword error rate indicate that such a drop is needed, but WATS 102 may also decide to transmit data traffic at a higher channel to a wireless modem when SNR and codeword error rate deem that such a change would be beneficial The above process performs steps 1124–1132 continuously as data is sent downstream from the WATS MAC.

CONCLUSION

The previous description of the preferred embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A downstream adaptive modulation system, comprising:
   a wireless access termination system (WATS); and
   one or more wireless modems;
   said wireless access termination system including a plurality of queues and a parser for parsing a data stream onto said plurality of queues, each of said queues having a different coding and modulation scheme, wherein said one or more wireless modems receives said data stream from said plurality of queues based on its ability to demodulate and decode the signals in said plurality of queues.

2. The system of claim 1, wherein each of said queues comprises:
   an encoder and modulator for encoding and modulating the parsed data in each of said queues according to a modulation order and set of forward error correction parameters, wherein said modulation order and set of forward error correction parameters are different for each of said queues.

3. A downstream adaptive modulation system, comprising:
   a wireless access termination system (WATS); and
   one or more wireless modems;
   said wireless access termination system including a plurality of queues and a parser for parsing a data stream onto said plurality of queues, each of said queues having a different coding and modulation scheme, a filter, and an upconverter for filtering and upconverting the parsed data stream in each of said queues into subchannels, wherein said one or more wireless modems receives said data stream from said plurality of queues based on its ability to demodulate and decode the signals in said plurality of queues.

4. The system of claim 3, wherein said wireless access termination system further comprises:
   a summer for combining each of said subchannels into one data channel; and
   a transceiver for transmitting said one data channel to said one or more wireless modems.

5. The system of claim 4, wherein said wireless access termination system combines each of said subchannels into one data channel using a frequency division multiplexing scheme.

6. An adaptive modulation system, comprising:
   a wireless access termination system (WATS); and
   a plurality of wireless modems, each of said wireless modems comprising,
   a transceiver for receiving a data channel from said WATS containing a plurality of subchannels;
   a splitter to split the power level of said data channel n-ways; and
   a plurality of queues;
   wherein n is equal to the number of queues in said plurality of queues, wherein each of said queues is associated with a different modulation order and FEC coding rate, wherein each of wireless modems receives data from said plurality of queues based on its ability to demodulate the signals in said plurality of queues.

7. An adaptive modulation system, comprising:
a wireless access termination system (WATS); and
a plurality of wireless modems, each of said wireless modems comprising:
a transceiver for receiving a data channel from said WATS containing a plurality of subchannels;
a splitter to split the power level of said data channel n-ways; and
a plurality of queues, wherein each of said queues has a filter and a downconverter for filtering and downconverting said data channel into an appropriate subchannel for said queue;
wherein n is equal to the number of queues in said plurality of queues, wherein each of said queues is associated with a different modulation order and FEC coding rate, wherein each of wireless modems receives data from said plurality of queues based on its ability to demodulate the signals in said plurality of queues.

8. The system of claim 7, wherein each of said queues comprises:
a decoder and demodulator for decoding and demodulating said subchannels according to a modulation order and set of forward error correction parameters, wherein said modulation order and set of forward error correction parameters are different relative to other queues.

9. The system of claim 6, wherein each of said wireless modems further comprises a multiplexer for selecting each of said signals from said queues that said each of said wireless modems is capable of demodulating and configuring a data stream for each of said wireless modems.

10. The system of claim 9, wherein said multiplexer inserts null data into said data stream for data from said queues in which each of said wireless modems is incapable of demodulating.

11. The system of claim 9, wherein said data stream is an MPEG data stream.

12. A method for providing downstream adaptive modulation in a broadband terrestrial fixed wireless system, comprising the steps of:
periodically receiving signal health metrics from wireless modems;
receiving a data stream and a rule for parsing the data stream into a plurality of queues for individual wireless modems, wherein each queue has a different modulation order;
encoding and modulating the parsed data in each queue according to the associated modulation scheme for the queue;
combining the encoded and modulated parsed data from each queue according to frequency; and
transmitting the combined data to the wireless modems.

13. The method of claim 12, wherein said receiving step further comprises the step of receiving a data stream and a rule for parsing the data stream into a plurality of queues for individual wireless modems, wherein each queue has a different set of forward error correction parameters.

14. The method of claim 12, wherein the signal health metrics include signal-to-noise ratio, codeword error rate, and other types of signal health metrics.

15. A method for providing downstream adaptive modulation in a broadband terrestrial fixed wireless system, comprising:
periodically receiving signal health metrics from wireless modems;
receiving a data stream and a rule for parsing the data stream into a plurality of queues for individual wireless modems, wherein each queue has a different modulation order;
encoding and modulating the parsed data in each queue according to the associated modulation scheme for the queue;
combining the encoded and modulated parsed data from each queue according to frequency; and
transmitting the combined data to the wireless modems; and
wherein the combining step comprising:
filtering and upconverting the encoded and modulated parsed data from each queue into a subchannel; and
combining each subchannel from each queue into one data channel using a frequency division multiplexing scheme.

16. A method for providing downstream adaptive modulation in a broadband terrestrial fixed wireless system, comprising the steps of:
receiving a channel of data from a wireless access termination system, wherein the channel of data is comprised of a plurality of subchannels;
placing said channel of data in a plurality of queues, wherein each queue has a different modulation order;
demodulating and decoding said channel of data into an appropriate subchannel of data in each queue based on the ability of said queue to demodulate and decode said subchannel of data;
combining the data from each subchannel to reconstruct a data stream; and
transmitting the data stream to a user device.

17. The method of claim 16, wherein said demodulating and decoding step further comprises the step of demodulating and decoding said channel of data into an appropriate subchannel of data in each queue based on the ability of said queue to demodulate and decode said subchannel of data, wherein each queue has a different set of FEC parameters.

18. The method of claim 16, further comprising the steps of:
periodically measuring downstream signal health metrics for each queue in the wireless system; and
periodically communicating the signal health metrics to the wireless access termination system.

19. The method of claim 16, wherein said placing step comprises the step of splitting the power level of said channel of data n-ways, wherein n corresponds to the number of queues in said plurality of queues.

20. The method of claim 16, wherein said combining step further comprises the steps of:
combining the data from each subchannel into said data stream, wherein null data is used for those queues in which the wireless modem is incapable of demodulating and decoding.

21. The method of claim 16, further comprising the step of:

enabling the wireless modem to drop down to a lower order modulation queue to receive data when errors are detected.

22. The method of claim 16, further comprising the step of:

enabling the wireless modem to adapt to a different queue having a different order modulation when a change in signal-to-noise ratio or codeword error rate occurs.

23. The method of claim 16, further comprising the step of:

enabling the wireless modem to adapt to a different queue having a different set of FEC parameters when a change in signal-to-noise ratio or codeword error rate occurs.

24. The method of claim 16, further comprising the step of:

enabling the wireless modem to receive data from a higher order modulation queue when the wireless modem's signal-to-noise ratio increases.

* * * * *